(12) United States Patent
Nagai et al.

(10) Patent No.: US 8,090,492 B2
(45) Date of Patent: Jan. 3, 2012

(54) VEHICLE MOTION MEASUREMENT APPARATUS, A VEHICLE ABNORMAL MOTION PREVENTION APPARATUS AND A DRIVE RECORDER

(75) Inventors: Masao Nagai, Fuchu (JP); Yohei Michitsuji, Fuchu (JP); Pongsathorn Raksincharoensak, Fuchu (JP)

(73) Assignee: National University Corporation Tokyo University of Agriculture and Technology, Tokyo (JP)

( * ) Notice: Subject to any disclaimer, the term of this patent is extended or adjusted under 35 U.S.C. 154(b) by 651 days.

(21) Appl. No.: 12/223,594

(22) PCT Filed: Feb. 7, 2007

(86) PCT No.: PCT/JP2007/052551
§ 371 (c)(1),
(2), (4) Date: Jan. 23, 2009

(87) PCT Pub. No.: WO2007/091723
PCT Pub. Date: Aug. 16, 2007

(65) Prior Publication Data
US 2009/0276114 A1    Nov. 5, 2009

(30) Foreign Application Priority Data
Feb. 7, 2006   (JP) ................................. 2006-030342

(51) Int. Cl.
*G01M 17/00*   (2006.01)
(52) U.S. Cl. ................. 701/29; 701/35; 701/36; 701/37; 701/70; 701/75; 340/429; 340/440; 340/441; 340/444; 340/446; 303/20; 303/13; 303/138; 303/148; 303/163; 280/5.501; 280/5.502; 280/5.504; 280/5.506; 280/5.513; 180/197; 180/271; 180/282; 477/34; 477/107

(58) Field of Classification Search .................... 701/29, 701/35, 36, 37, 38, 45, 48, 70, 72, 74, 75, 701/82, 90, 117, 124, 201, 204, 208, 301; 340/429, 440, 441, 444, 446, 447, 465, 466, 340/467, 905, 988, 995.13; 303/20, 13, 138, 303/148, 146, 163, 158, 168, 174; 280/5.501, 280/5.502, 5.504, 5.506, 5.513, 5.514, 6.15, 280/6.159, 735, 755, 756; 180/197, 271, 180/282; 477/34, 107
See application file for complete search history.

(56) References Cited

U.S. PATENT DOCUMENTS
4,769,759 A * 9/1988 McGough ......................... 701/6
(Continued)

FOREIGN PATENT DOCUMENTS
JP   H09-118212   5/1997
(Continued)

*Primary Examiner* — James Trammell
*Assistant Examiner* — McDieunel Marc
(74) *Attorney, Agent, or Firm* — Manabu Kanesaka

(57) ABSTRACT

The apparatus comprises a measured signal detector 11, a vehicle parameter obtainer 12, a sideslip angle temporary estimator 13, a sideslip angle differential corresponding value computer 14 and a sideslip angle real estimator 15. A sideslip angle temporary estimate value is computed from one or plural vehicle parameters including at least the mass. A sideslip angle differential corresponding value is computed from a measured signal and the vehicle parameters including no mass. A sideslip angle is derived from the sideslip angle temporary estimate value and the sideslip angle differential corresponding value. A sideslip can be detected without a steering angle detection mechanism.

5 Claims, 11 Drawing Sheets

U.S. PATENT DOCUMENTS

| | | | |
|---|---|---|---|
| 4,830,127 A * | 5/1989 | Ito et al. | 180/446 |
| 5,455,770 A * | 10/1995 | Hadeler et al. | 701/70 |
| 6,745,112 B2 * | 6/2004 | Mori | 701/1 |
| 6,853,886 B2 * | 2/2005 | Mori | 701/1 |
| 6,859,713 B2 * | 2/2005 | Pallot | 701/72 |
| 6,904,349 B2 * | 6/2005 | Mori | 701/70 |
| 6,954,691 B2 * | 10/2005 | Roll et al. | 701/70 |
| 7,097,262 B2 * | 8/2006 | Sasaki | 303/147 |
| 7,496,436 B2 * | 2/2009 | Galkowski et al. | 701/41 |
| 7,558,657 B2 * | 7/2009 | Manken et al. | 701/41 |
| 7,844,383 B2 * | 11/2010 | Shinozawa et al. | 701/72 |
| 2003/0093190 A1 * | 5/2003 | Mori | 701/1 |
| 2010/0114449 A1 * | 5/2010 | Shiozawa et al. | 701/90 |

FOREIGN PATENT DOCUMENTS

| | | |
|---|---|---|
| JP | H10-109630 | 4/1998 |
| JP | 2002-140798 | 5/2002 |
| JP | 2004-142546 | 5/2004 |

* cited by examiner $$\beta_1 = \frac{l_r}{V}\gamma - \frac{mL_f}{2LC_r}a_y \qquad (5)$$

$$\beta_2 = \int_0^t \dot{\beta}\, dt \qquad (6)$$

$$\hat{\beta} = \frac{1}{1+G_s}\beta_2 + \frac{G_s}{1+G_s}\beta_2 \qquad (7)$$

Fig.9 Dry Road Surface ($\mu = 0.8$)

Low Friction Road Surface

VEHICLE MOTION MEASUREMENT APPARATUS, A VEHICLE ABNORMAL MOTION PREVENTION APPARATUS AND A DRIVE RECORDER

TECHNICAL FIELD

The present invention relates to a vehicle motion measurement apparatus, a vehicle abnormal motion prevention apparatus and a drive recorder for estimating a sideslip without mounting a steering angle detection mechanism on a vehicle.

BACKGROUND ART

Recently, more vehicles with sideslip measurement apparatuses are provided to assist drivers. It is effective to prevent accidents especially in case of snow or rainy weather by estimating a sideslip at the initial stage of a sideslip by using a sideslip measurement apparatus and supporting the drivers' operation.

As a conventional technique for estimating a sideslip, a technique for calculating a sideslip angle using an acceleration, a yaw-rate, a vehicle velocity and a steering angle as measured signals (a vehicle traveling wheel slip angle detection apparatus) is known (see Japanese Laid-open Patent Application No. Tokkai 2000-25599, hereinafter referred to as "reference prior art").

According to the sideslip measurement apparatus described in the reference prior art, the steering angle is used as a measured signal for sideslip angle estimation. However a large mechanism is required to detect the steering angle by the disclosed technique in the reference prior art. Therefore, although sideslip measurement apparatuses is desired to be mounted on vehicles, they are seldom mounted on the general purpose vehicles.

Drive recorders are becoming popular to provide drivers with advices for safety driving or identifying the causes of an accident by recording the driving histories.

It can be considered to mount a conventional sideslip measurement apparatus on a drive recorder, however the derive recorder itself necessarily becomes complicated because the aforementioned mechanism for steering angle detection is needed to mount such an apparatus on a vehicle.

BRIEF SUMMARY OF THE INVENTION

The purpose of the present invention is to provide a vehicle motion measurement apparatus, a vehicle abnormal motion prevention apparatus and a drive recorder for estimating a sideslip without mounting a steering angle detection mechanism on a vehicle.

(1) A vehicle motion measurement apparatus comprising
a state variable estimator for detecting plural measured signals during driving other than a steering angle which change depending on the equipped condition of a vehicle;
a vehicle parameter obtainer for obtaining at least one vehicle parameter that do not change by the equipped condition of the vehicle;
a sideslip angle temporary estimator for computing a sideslip angle temporary estimates value from a fist set of measured signals selected from the plural driving measured signals and at least one vehicle parameter including the mass;
a sideslip angle differential corresponding value computer for computing a sideslip angle differential corresponding value from a second set of signals selected from the plural driving measured signals and at least one vehicle parameter including no mass; and
a sideslip angle combined estimator for performing a precise estimation of a sideslip angle from the sideslip angle temporary estimate value and the sideslip angle differential corresponding value.

(2) A vehicle motion measurement apparatus according to (1), wherein the sideslip angle temporary estimator computes the sideslip angle temporary estimate value by a sideslip angle temporary estimation function:

$$\beta_E = K_1 \times (\gamma/V) + K_2 \times a_y$$

where,
$K_1, K_2$: coefficients including vehicle parameters
$\gamma$: yaw-rate
$V$: vehicle velocity
$a_y$: vehicle lateral acceleration (3) A vehicle motion measurement apparatus according to (2), wherein $K_1 = L_r$, $$K_2 = mL_f/(2L \times C_r),$$

where
$L$: distance between the front axle and the rear axle
$L_f$: approximated distance between the vehicle gravity center and the front wheel axle
$L_r$: approximated distance between the vehicle gravity center and the rear wheel axle
$m$: vehicle mass
$C_r$: cornering stiffness value (4) A vehicle motion measurement apparatus according to either one of (1) through (3), wherein the sideslip angle differential corresponding value computer computes the sideslip angle differential corresponding value by a sideslip angle differential corresponding value function:

$$\beta^D = (a_Y/V) - \gamma$$

(5) A vehicle abnormal motion prevention apparatus comprising a vehicle motion measurement apparatus according to either one of (1) through (4) and a sideslip prevention control means, wherein the sideslip prevention control means generates a brake signal in response to the estimation result of the sideslip angle and sends out it to a brake system.

(6) A vehicle motion measurement apparatus for estimating a sideslip angle comprising
a driving state variable estimator for detecting plural driving measured signals other than a steering angle that change depending on the driving condition of a vehicle;
a vehicle parameter obtainer for obtaining at least one vehicle parameter that do not change by the equipped condition of the vehicle;
a stationary state process system having a sideslip angle estimator for estimating a sideslip angle $\beta_1$ from a stationary state model and a fist filter for performing a first filtering process on the output of the sideslip angle estimator; and
a sideslip state process system having a sideslip angular velocity estimator for estimating a sideslip angular velocity $d\beta/dt$ and a second filter for integrating the output of the sideslip angular velocity estimator and performing a second filtering process on the integrated value $\beta_2$, so that the sideslip angle is measured by summing up both of the process systems.

(7) A vehicle motion measurement apparatus according to (6), wherein $$\beta_1 = (L_r/V) - mL_f/(2L \times C_r)$$

$$\beta_2 = \int (d\beta/dt) dt$$

where,

L: distance between the front axle and the rear axle $L_f$: approximate distance between the vehicle gravity center and the front wheel axle $L_r$: approximate distance between the vehicle gravity center and the rear wheel axle m: vehicle weight $C_r$: cornering stiffness value V: vehicle velocity (8) A vehicle motion measurement apparatus according to (6) or (7), wherein the first filter is a low-pass filter $[1/(1+G_s)]$, the second filter is a high-pass filter $[G_s/(1+G_s)]$, and the measured value of the sideslip angle is $[1/(1+G_s)]\beta_1 + [G_s/(1+G_s)]\beta_2$.

(9) A vehicle abnormal motion prevention apparatus comprising a vehicle motion measurement apparatus according to (6) or (7) and a sideslip prevention control means, wherein the sideslip prevention control means generates a brake signal in response to the estimation result of the sideslip angle and sends out it to a brake system.

(10) A vehicle motion measurement apparatus comprising a vehicle state variable estimator for detecting (A) a first measured signal that is either a yaw angle $\phi$, or a yaw angle $\phi$ and a pitch angle $\theta$ and (B) a second measured signals during driving including at least a lateral acceleration $a_y$ and a vertical acceleration $a_z$ other than the first measured signals, and a rollover risk computer for computing the rollover risk based on the first measured signals and the second measured signals.

(11) A vehicle motion measurement apparatus according to (9), wherein the second measured signals further comprises either one or both of a longitudinal acceleration $a_x$ and a yaw-rate $\gamma$.

(12) A vehicle abnormal motion prevention apparatus comprising a vehicle motion measurement apparatus according to (10) or (11) and a sideslip prevention control means, wherein the sideslip prevention control means generates a brake signal in response to the measurement result of the sideslip angle and sends out the brake signal to a brake system.

(13) A drive recorder having a vehicle motion measurement apparatus according to either on of (1) though (12).

DETAILED DESCRIPTION OF THE INVENTION

According to the present invention, a sideslip angle temporary estimated value is computed from a measured signals and one or plural parameter including at least the mass, a sideslip angle differential corresponding value is computed from a measured signals and the vehicle parameter other than the mass, and a sideslip angle is computed from the sideslip angle temporary estimated value and the sideslip angle differential corresponding value.

An appropriate control can be realized even during intermediate between a stationary state operation and a sideslip occurrence (for example at the occurrence of a small sideslip) because the transition between the control at a stationary state operation and the control at a sideslip occurrence is based on a continuous function (a transfer function represented by one formula).

According to this configuration, a sideslip value can be estimated without mounting a steering angle detection mechanism. That is to say, a sideslip can be measured by a less expensive and simple configuration.

BEST MODE FOR CARRYING OUT THE INVENTION

First Embodiment

Figure 1:
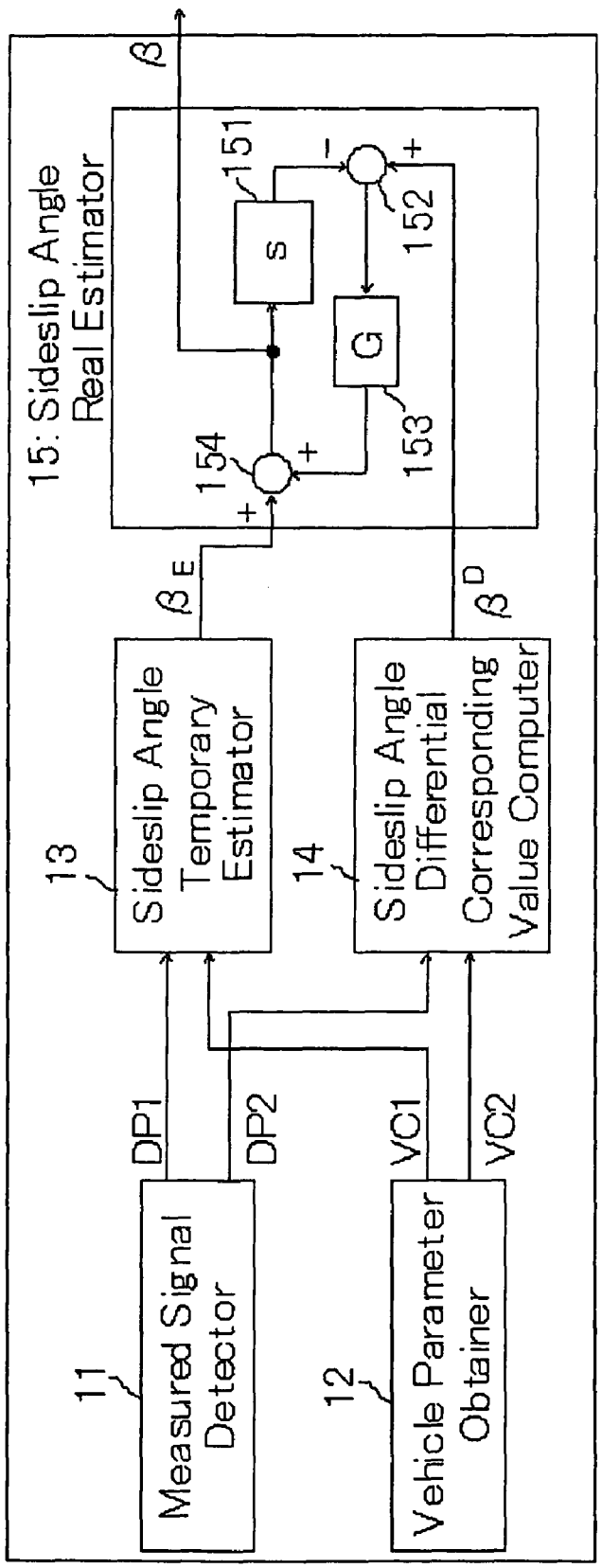
FIG. 1 is a block diagram showing the first embodiment of a vehicle motion measurement apparatus (a sideslip measurement apparatus) according to the present invention.

FIG. 1 is a block diagram showing the first embodiment of a vehicle motion measurement apparatus (a sideslip prevention apparatus) according to the present invention.

In FIG. 1, a sideslip measurement apparatus 1 comprises a measured signal detector 11, a vehicle parameter obtainer 12, a sideslip angle temporary estimator 13, a sideslip angle differential corresponding value computer 14 and a sideslip angle real estimator 15.

Figure 2:
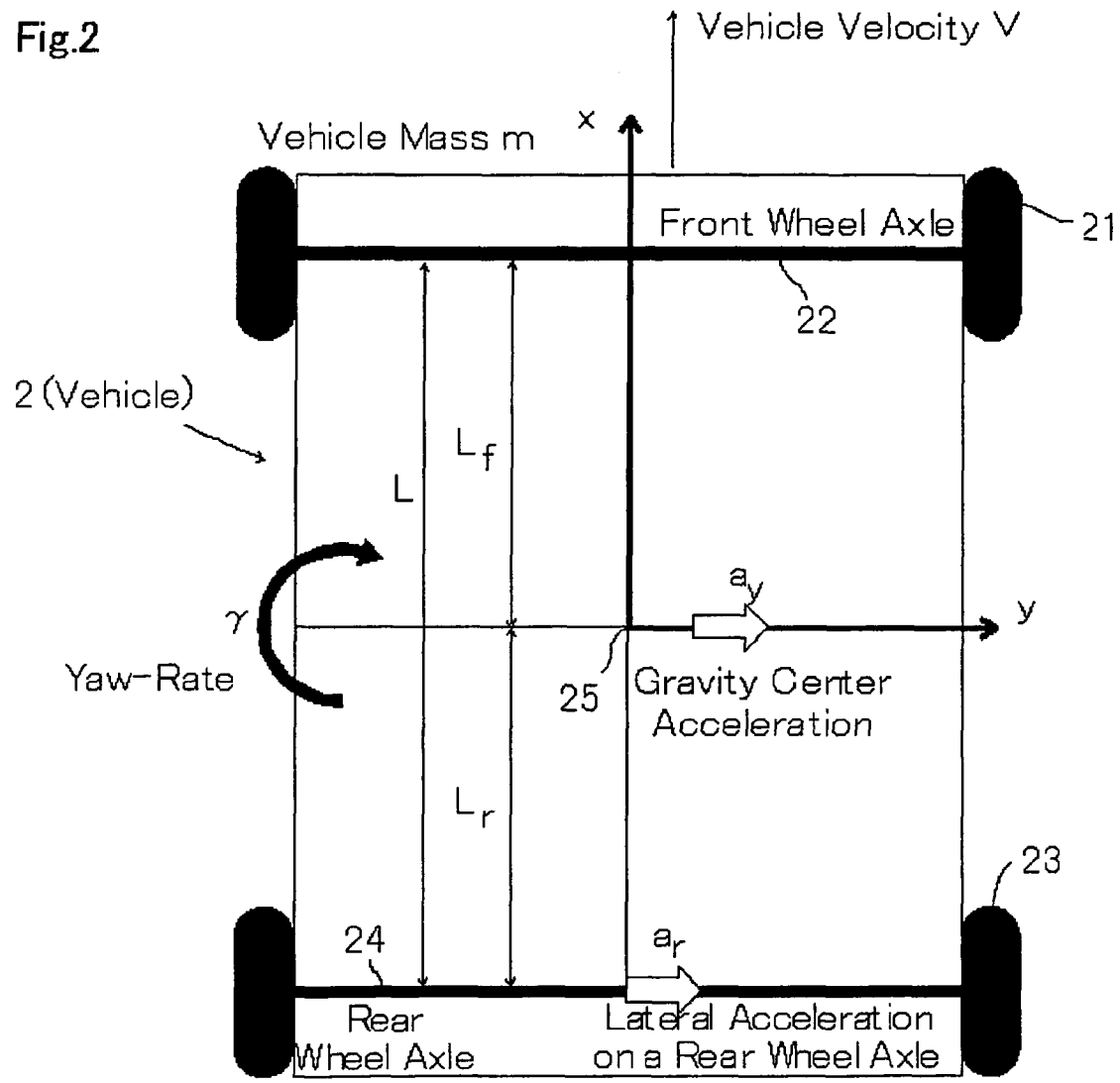
FIG. 2 shows a vehicle to explain the first embodiment of a vehicle motion measurement apparatus shown in FIG. 1.

FIG. 2 is an explanatory drawing of a vehicle for assisting the explanation of each signal. In FIG. 2, a vehicle 2 comprises a front wheel 21, a front wheel axle 22, a rear wheel 23 and a rear wheel axle 24. The gravity center is shown by the reference numeral 25.

The distance between the gravity center 25 and the front wheel axle 22 is represented by $L_f$, the distance between the gravity center 25 and the rear wheel axle 24 is represented by $L_r$, the distance between the front wheel axle 22 and the rear wheel axle 24 is represented by L, the vehicle mass is represented by m, the traveling direction of the vehicle 2 is represented by x, and the crosswise direction is represented by y.

The measured signal detector 11 detects plural measured signals other than the steering angle that change depending on the vehicle equipped condition. The driving state parameters comprise a yaw-rate $\gamma$, a vehicle velocity V, a lateral acceleration on a rear wheel axle $a_r$ (or a vehicle lateral acceleration $a_y$), a cornering stiffness $C_r$, etc.

In FIG. 1, DP1 represents a first set of measured signals sent to the sideslip angle temporary estimator 13, and DP2 represents a first set of signal sent to the sideslip angle differential corresponding value computer 14.

The vehicle parameter obtainer 12 obtains at least one vehicle parameter that do not change depending on the vehicle driving condition. The vehicle parameter VC comprise the vehicle mass m, the distance between the gravity center and the front wheel axle $L_f$, the distance between the gravity center and the rear wheel axle $L_r$.

In FIG. 1, the vehicle parameter sent to the sideslip angle temporary estimator 13 is represented by VC1, and the constant sent to the sideslip angle differential corresponding value computer 14 is represented by VC2.

The sideslip angle temporary estimator 13 computes a sideslip angle temporary estimate value $\beta_E$ from the measured signals (comprising a first set of signals DP1 and a second set of signals DP2 selected from plural measured signals and one or plural vehicle parameter VC including at least the mass m (these constants will be explained later).

The sideslip angle differential corresponding value computer 14 computes a sideslip angle differential corresponding value $\beta^D$ from the measured signals and vehicle parameter which do not include the mass m (or a cornering stiffness value $C_r$).

The sideslip angle combined estimator 15 performs a precise estimation for a sideslip angle B (Beta) from the sideslip angle temporary estimate value $\beta_E$ and the sideslip angle differential corresponding value $\beta^D$.

The sideslip angle real estimator 15 can be configured by a feedback system and can comprise a differentiator 151 for receiving the output ($\beta_E$) of the sideslip angle temporary estimator 13 through an adder 154 and differentiates it, a subtractor 152 for subtracts the output ($d\beta_E/dt$) of the differentiator 151 from the output ($\beta^D$) of the sideslip angle differential corresponding value computer 14, a feedback means for giving a predetermined gain (G) to the output of the subtractor 152 and feeding back to the differentiator 151, and an adder 154 for adding the output $G\cdot(\beta^D-d\beta_E/dt)$ of the differentiator 151 to the output ($\beta_E$) of the sideslip angle temporary estimator 13.

A more detailed configuration of the sideslip measurement apparatus 1 in FIG. 1 will be explained referring to FIG. 3 and FIG. 4.

Figure 3:
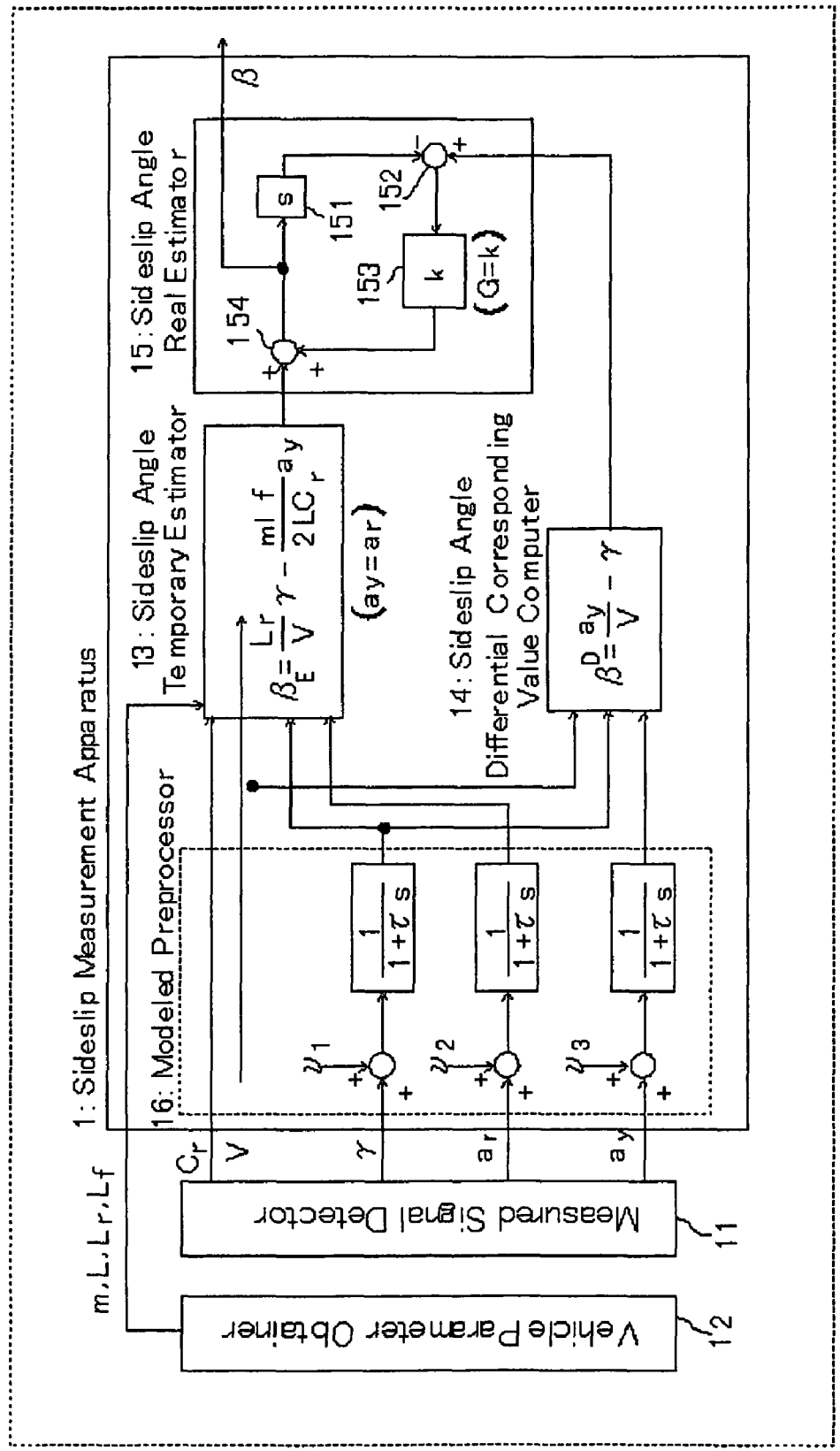
FIG. 3 shows a more detailed example of the vehicle motion measurement apparatus shown in FIG. 1.

In FIG. 3, the sideslip measurement apparatus 1 is mounted on the vehicle 2 and obtains V, $\gamma$, $a_r$, $a_y$, $C_r$ from the measured signal detector 11. The preprocessor 16 removes the noises $v_1$, $v_2$, $v_3$ included in $\gamma$, $a_r$, $a_y$ by the low-pass filter (transfer function $1/(1+\tau s)$). Although $C_r$ can be considered as a constant, it is treated as one of the tuning parameters in this embodiment. In actual, the noises $v_1$, $v_2$, $v_3$ are included in V, $\gamma$, $a_r$, $a_y$ virtually, a modeled preprocessor 16 is shown in FIG. 3 and the noises $v_1$, $\mu_2$, $v_3$ are indicated separate from V, $\gamma$, $a_r$, $a_y$ virtually. The sideslip measurement apparatus 1 obtains m, L, $L_f$, $L_f$ from the vehicle parameter obtainer 12.

The sideslip angle temporary estimator 13 can temporarily estimate the sideslip angle by a sideslip angle temporary estimate function:

$$\beta_E = L_r \times (\gamma/V) + (mL_f/2LC_r) \times a_r \quad (1)$$

where the abovementioned $K_1$ and $K_2$ are set to, $$K_1 = L_r$$

$$K_2 = mL_f/(2L \times C_r)$$

L represents the distance between the front wheel axle and the rear wheel axle.

As there is a relationship between the rear wheel axle acceleration $a_r$ and the vehicle lateral acceleration as $$a_r = a_y - L_1 \times (d\gamma/dt) \quad (2)$$

and $a_y \square L_1 \times (d\gamma/dt)$, it can be approximated as $a_r \square a_y$. Therefore, the formula (I) can be expressed by the formula (3).

$$\beta_E = L_r \times (\gamma/V) + (mL_f/2LC_r) \times a_y \quad (3)$$

The sideslip angle temporary estimator 13 in FIG. 3 computes the formula (3).

The sideslip angle differential corresponding value computer 14 computes a sideslip angle differential corresponding value by the sideslip angle differential corresponding value function (geometric function):

$$\beta^D = (a_y/V) - \gamma \quad (4)$$

The transfer function G for the feedback means 153 in FIG. 3 is a constant (a proportional value) k. When the transfer function G is the constant k and the vehicle lateral acceleration $a_y$ has an offset, the vehicle lateral acceleration $a_y$ is possibly not accurately measured because of accumulated offset errors.

Figure 4:
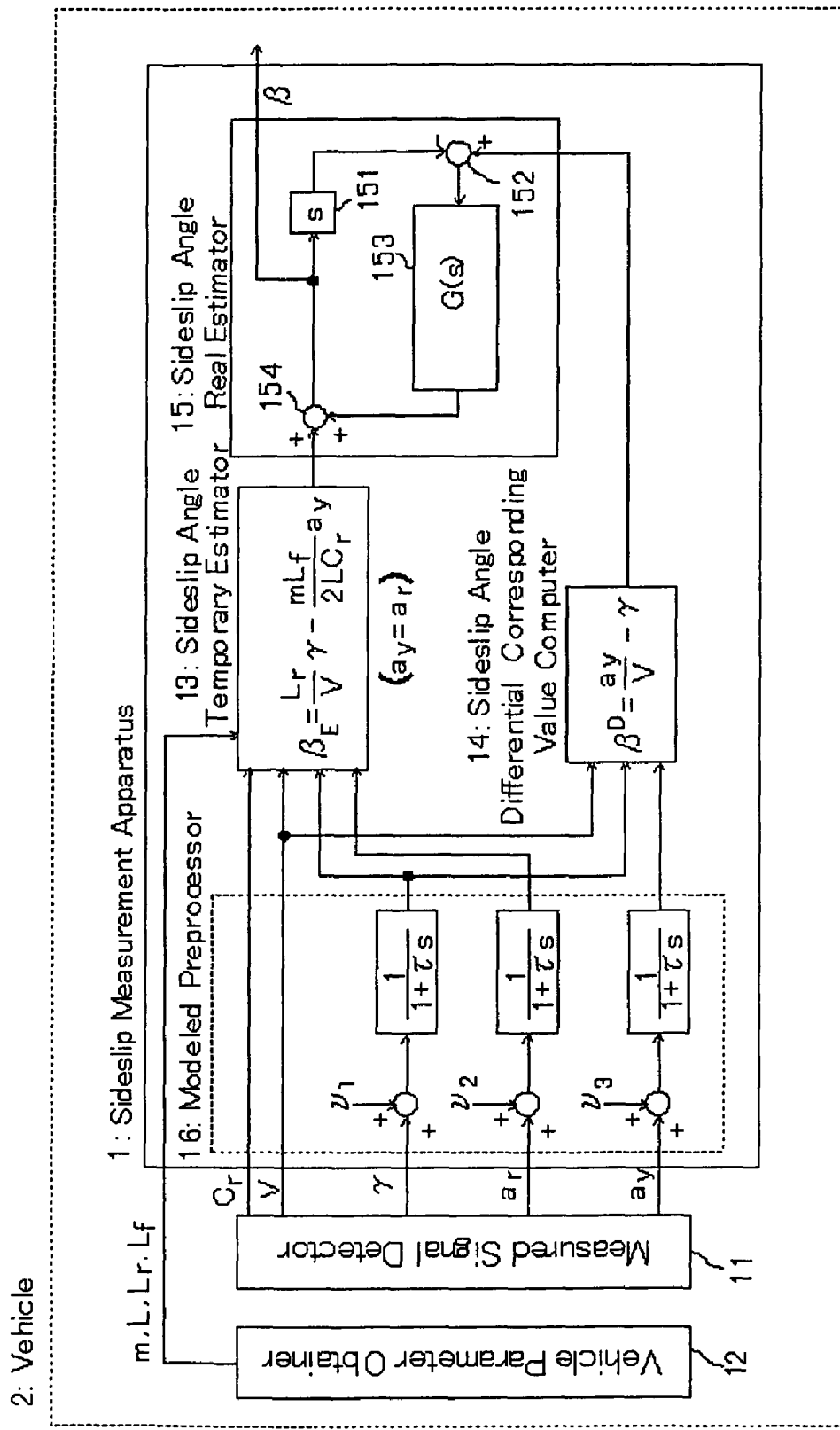
FIG. 4 shows a further more detailed example of the vehicle motion measurement apparatus shown in FIG. 1.

As shown in FIG. 4, the noises can be reduced and the estimation accuracy can be improved by adding frequency characteristic or nonlinear characteristic as a transfer function G(s) of the feedback means 153.

The accumulation of offset errors can be removed and the estimation accuracy is improved by the gain with frequency dependent characteristics.

Figure 5:
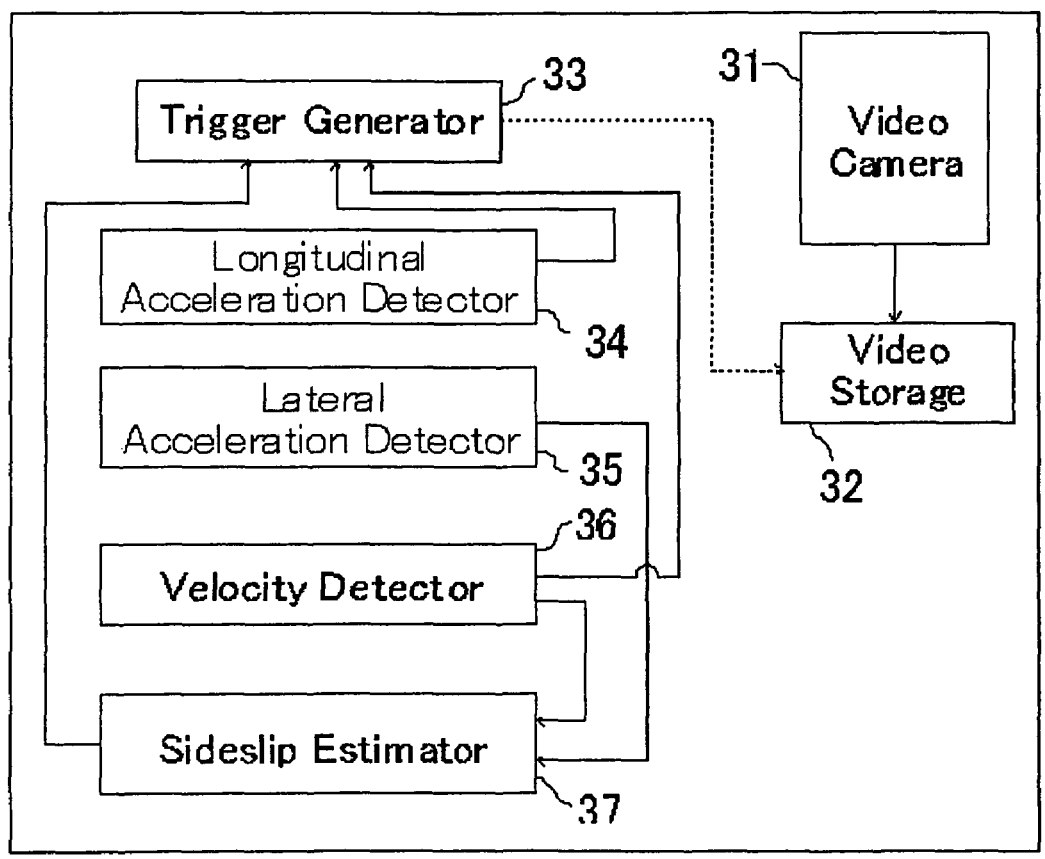
FIG. 5 shows a drive recorder including the vehicle motion measurement apparatus shown in FIG. 1.

FIG. 5 shows an embodiment of a drive recorder according to the present invention. In FIG. 5, a drive recorder 3 comprises a video camera 31, a video storage 32, a trigger generator 33, a longitudinal acceleration detector 34, a lateral acceleration detector 35, a velocity detector 36 and a sideslip estimator 37.

The lateral acceleration detector 35, the velocity detector 36 and the sideslip estimator 37 fulfill the function of the sideslip measurement apparatus 1 shown in FIGS. 1 through 4.

The trigger generator 33 generates a trigger based on the detection result by the velocity detector 36 and the longitudinal acceleration detector 34 and stores the images shot by the video camera 31 for a predetermined time period before and after the trigger generation in the video storage 32.

The trigger generator 33 generates a trigger based on the detection result by the sideslip finder 37 and stores the images shot by the video camera 31 for a predetermined time period before and after the trigger generation in the video storage 32.

A video buffer for storing the shot image for a predetermined time temporary, a storage devise for storing the velocity and the acceleration and an operation display are not shown in FIG. 5.

Second Embodiment

Figure 6:
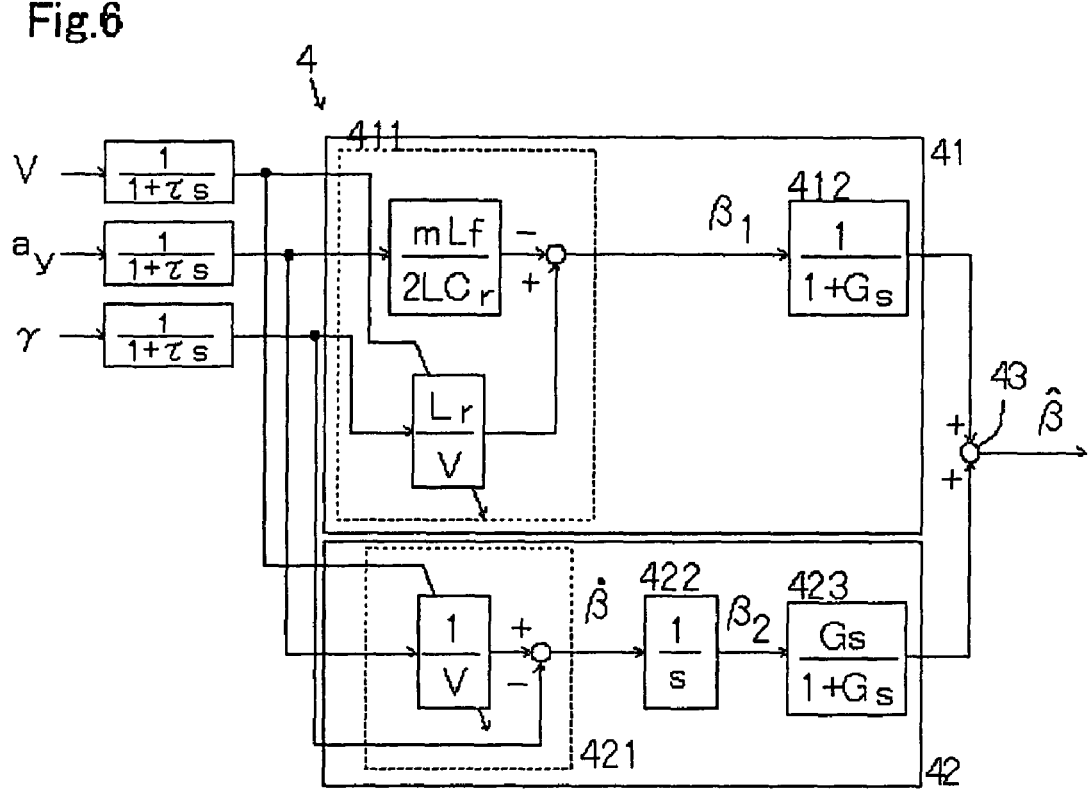
FIG. 6 is a block diagram showing the second embodiment of a vehicle motion measurement apparatus (a sideslip measurement apparatus) according to the present invention.

FIG. 6 is a block diagram showing the second embodiment of a vehicle operation measurement apparatus (a sideslip measurement apparatus) according to the present invention.

The vehicle operation measurement apparatus comprises a driving state variable estimator for detecting plural measured signals other than the steering angle that change depending on the vehicle equipped condition and a vehicle parameter obtainer for obtaining at least one vehicle parameter that do not change depending on the vehicle driving condition, however they are not shown in FIG. 6.

The sideslip prevention apparatus 4 in FIG. 6 comprises a stationary state process system 41 and a sideslip state process system 42. The stationary state process system 41 comprises a sideslip angle estimator 411 for estimating the sideslip angle $\beta_1$ from the stationary model and a first filter 412 for performing a first filtering process (stationary state emphasize process) on the output of the sideslip angle estimator.

The sideslip state process system 42 comprises a sideslip angular velocity estimator 421 for estimating the sideslip angular velocity $d\beta/dt$, an integrator 422 for integrating the output of the sideslip angular velocity calculator and a filter 423 for performing a second filtering process (sideslip state emphasize process) on the integration value $\beta_2$.

FIG. 6 shows the processing function in the stationary state process system 41 (Formula (5)) the processing function in the sideslip state process system 42 (Formula (6)) and the process result at the adder 43 (Formula (7)).

The adder 43 estimates the sideslip angle ($<<\beta>>$) by summing up the outputs of stationary state process system 41 and the sideslip state process system 42, where, $$\beta_1 = (L_r/V) - mL_f(2L \times C_r)$$

$$\beta_2 = \int (d\beta/dt)dt$$

$L_f$: distance between the front axle and the rear axle
$L_f$: approximated distance between the vehicle gravity center and the front wheel axle
$L_r$: approximated distance between the vehicle gravity center and the rear wheel axle
m: vehicle weight
$C_r$: cornering stiffness
V: vehicle velocity (see FIG. 2)

In this embodiment, the fist filter 412 is the low-pass filter $[1/(1+G_s)]$, and the second filter 422 is the high-pass filter $[G_s/(1+G_s)]$.

The measured value of the sideslip angle is represented by $[1/(1+G_s)]\beta_1 + [G_s/(1+G_s)]\beta_2$.

Although it is not shown in the drawing, the vehicle abnormal motion prevention apparatus comprises a vehicle motion measurement apparatus and a sideslip prevention control means. The sideslip prevention control means (typically comprising a hardware including a processor and a software (program) stored in a ROM, etc.) generates a brake signal and sends out it to a brake system in response to the measurement result of the sideslip angle.

The sideslip prevention apparatuses according to the first and second embodiments can be used together with a conventional sideslip prevention apparatus using a steering angle sensor.

It is possible to compare the measurement result by the sideslip prevention apparatus of the present embodiment with the measurement result by a conventional sideslip prevention apparatus (steering angle sensor) and inhibit the control by the sideslip prevention apparatus when the measurement results do not match.

When a failure is found in the steering angle sensor by some means, it is possible to either drive the sideslip prevention apparatus according to the present invention preferentially or inhibit control by the sideslip prevention apparatus by appropriate selection.

Figure 7:
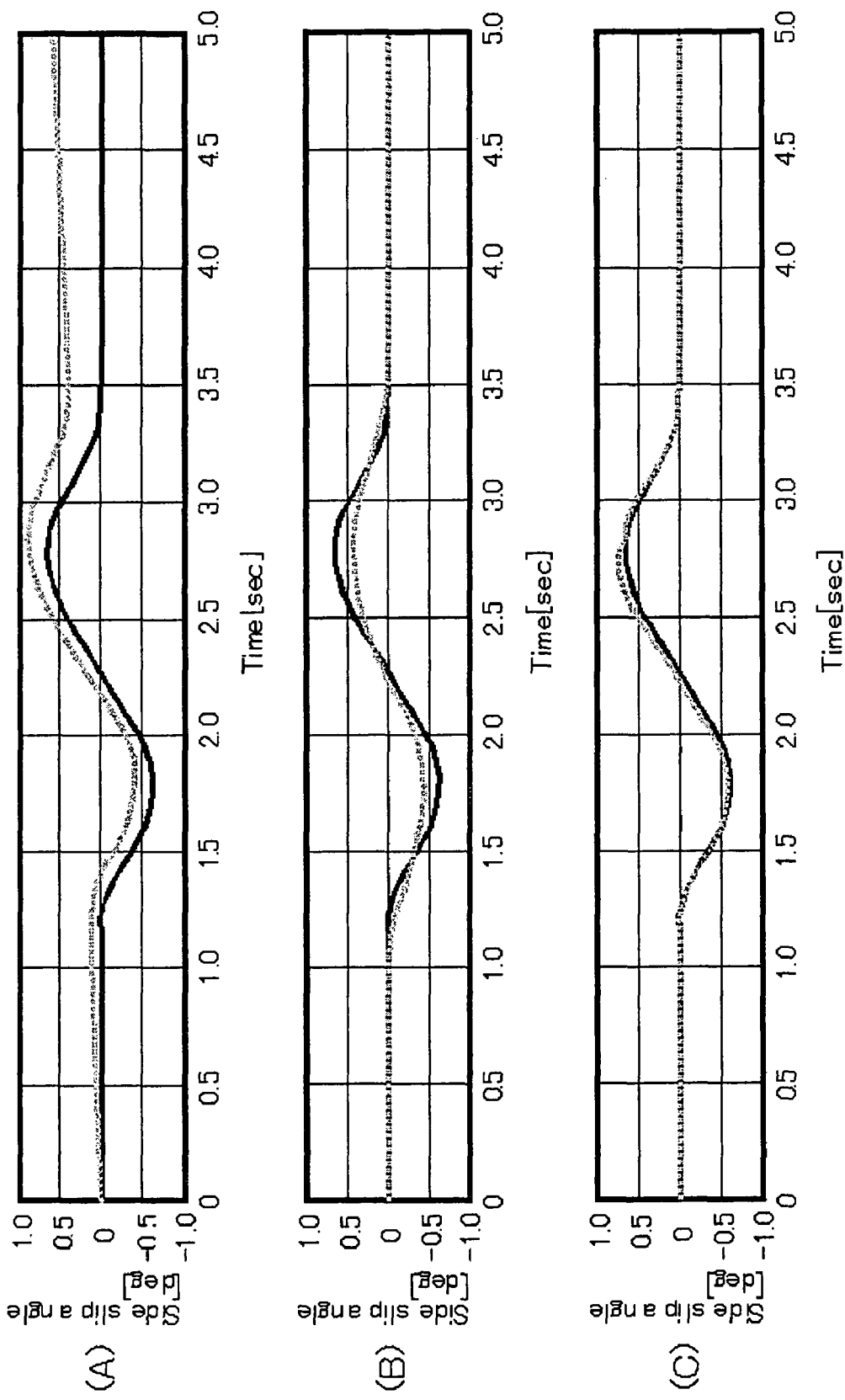
FIG. 7 shows a measurement result for the second embodiment shown in FIG. 6.

FIG. 7 is a wave pattern diagram showing the actual value (full line) and the computed value (dashed line) when the tire-road surface friction coefficient is 0.4. FIG. 7(A) shows the output of the stationary state process system 41. FIG. 7(B) shows the output of the sideslip state process system 42. FIG. 7(C) shows the output of the adder 43.

Figure 8:
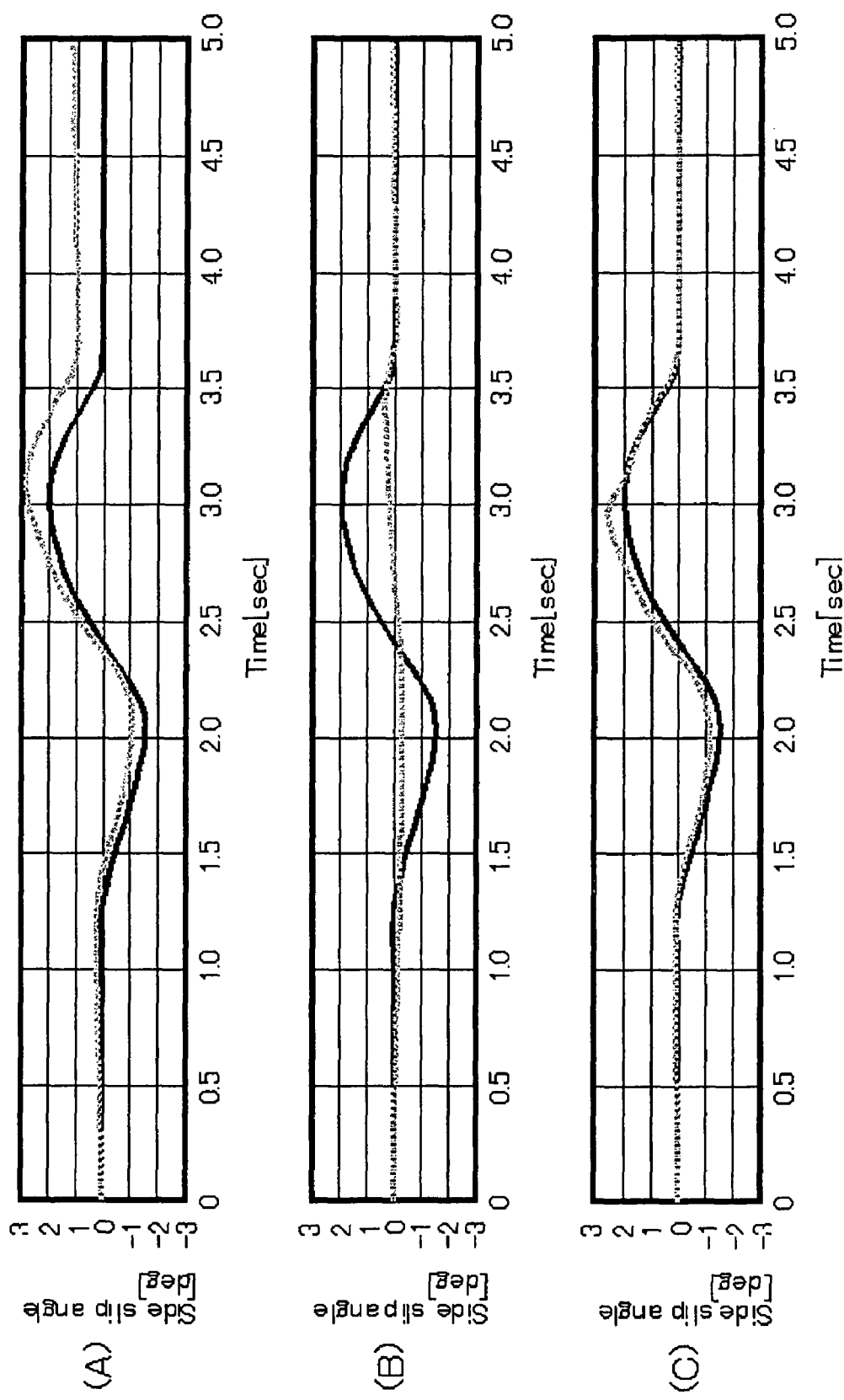
FIG. 8 shows a measurement result for the second embodiment shown in FIG. 6.

FIG. 8 is a wave pattern diagram showing the actual value (full line) and the computed value (dashed line) when the tire-road surface friction coefficient is 0.8. FIG. 8(A) shows the output of the stationary state process system 41. FIG. 8(B) shows the output of the sideslip state process system 42. FIG. 8(C) shows the output of the adder 43.

In FIG. 7 and FIG. 8,
Lateral acceleration distributed value $1 \times 10^{-2} (m/s^2)^2$, offset value 0.05 m/s$^2$
Yaw-rate: distributed value $1 \times 10^{-4} (rad/s)^2$, offset value 0

Figure 9:
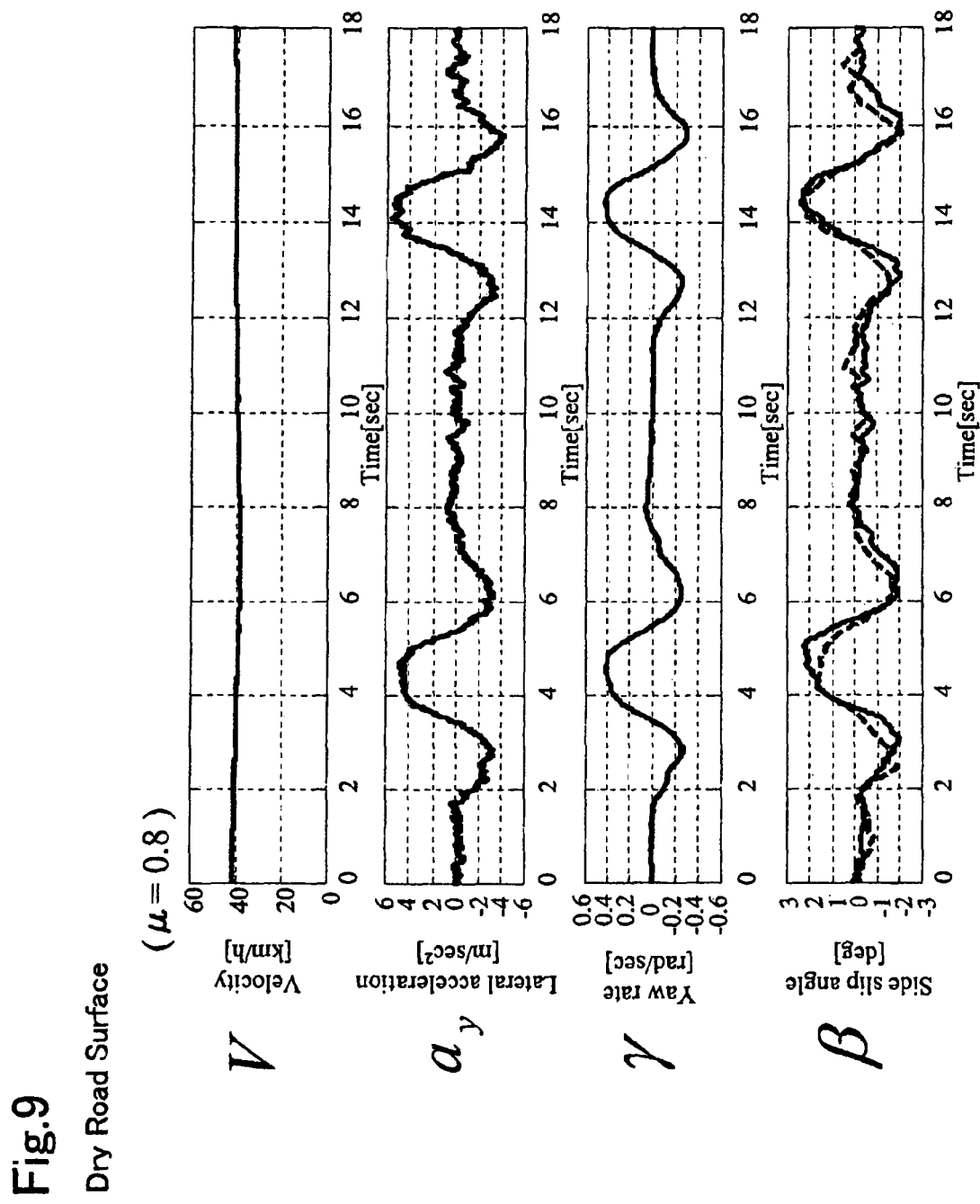
FIG. 9 shows a measurement result for the second embodiment shown in FIG. 6.
Figure 10:
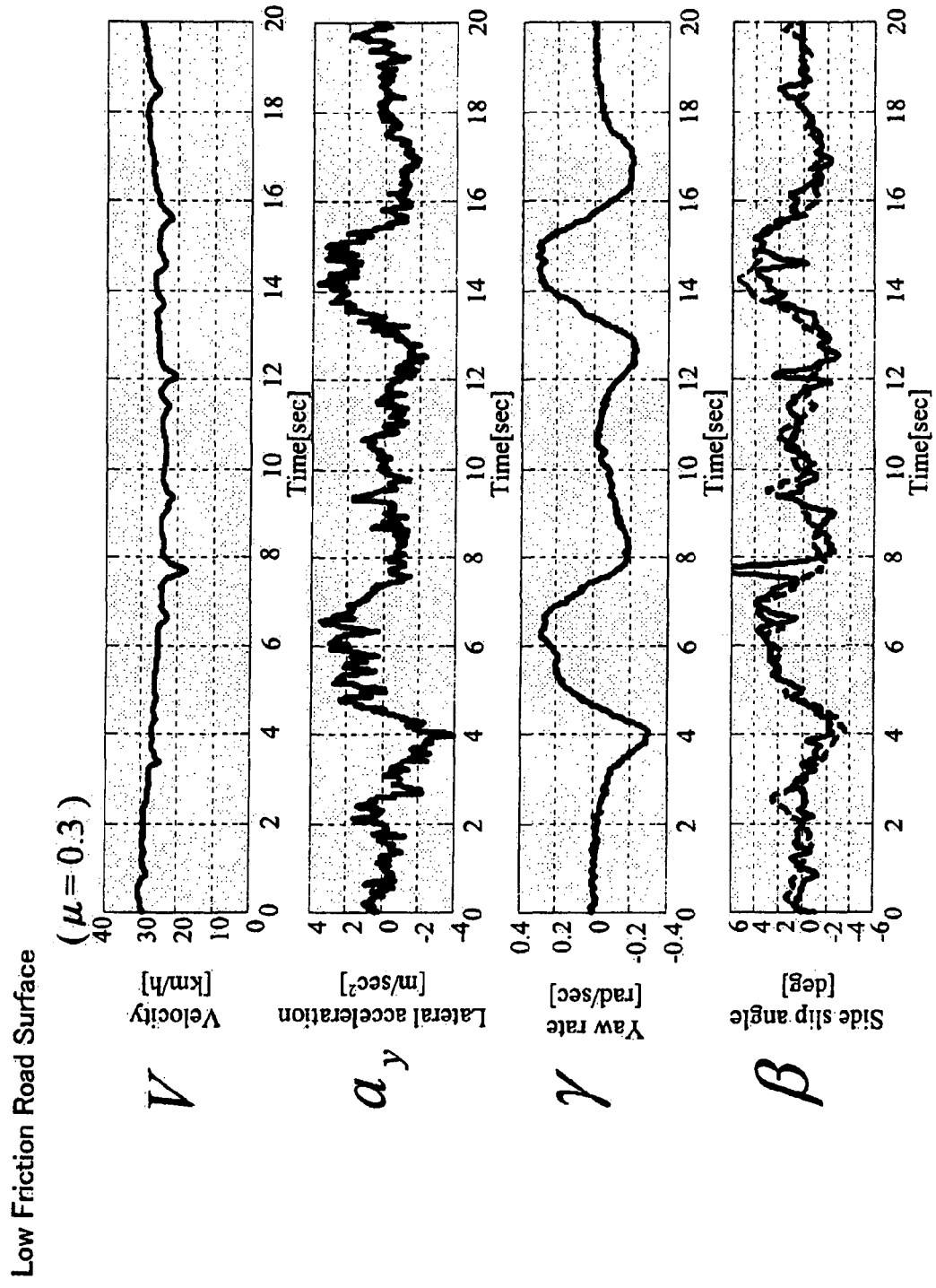
FIG. 10 shows a measurement result for the second embodiment shown in FIG. 6.

FIG. 9 shows the values for each parameter V, $a_y$, $\gamma$, $\beta$ in case of a dry road surface ($\mu=0.8$). FIG. 10 shows the value for each parameter V, $a_y$, $\gamma$, $\beta$ in case of a low friction road surface ($\mu=0.3$).

Third Embodiment

Figure 11:
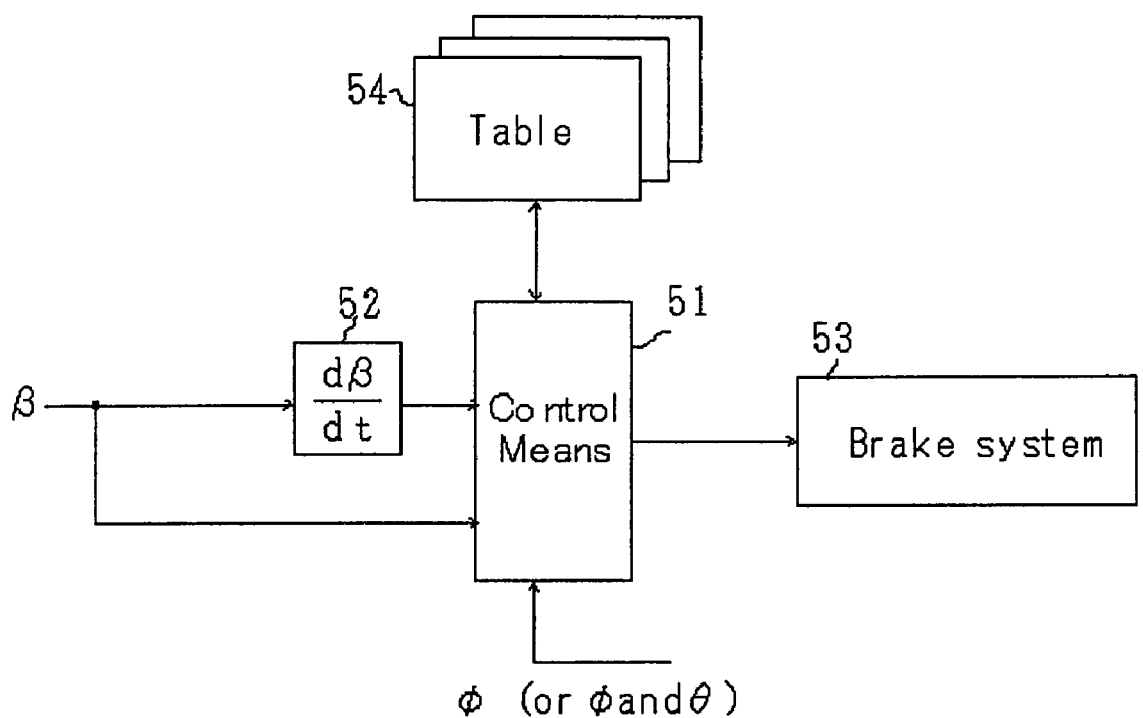
FIG. 11 is a block diagram showing the third embodiment of a vehicle motion measurement apparatus (a rollover risk measurement apparatus) according to the present invention.

FIG. 11 is a block diagram showing the third embodiment of a vehicle motion measurement apparatus (rollover risk measurement apparatus) according to the present invention.

Although it is not shown in FIG. 6, the apparatus comprises a state variable estimator for detecting plural measured signal other than the steering angle that change depending on the vehicle driving condition and a vehicle parameter obtainer for obtaining at least one vehicle parameter that do not change depending on the vehicle driving condition.

In FIG. 11, the rollover risk computer 51 receives (A) a first measured signal, i.e. either a yaw angle $\phi$, or a yaw angle $\phi$ and a pitch angle $\theta$, and (B) a second measured signal including at least a lateral acceleration $a_y$ and an vertical acceleration $a_z$ other than the first measured signals that are detected by the equipped sensors.

The differentiator 52 computes $\beta$ and the differential value is input to the rollover risk computer 51. The rollover risk computer 51 computes the rollover risk based on the first driving state parameter $\beta$ and the second measured signals ($\phi$ or $\phi$ and $\theta$).

The second state variable $\beta$ can further include either one or both of the longitudinal acceleration $a_x$ and the yaw-rate $\gamma$.

In this embodiment, the vehicle abnormal motion prevention apparatus comprises a vehicle motion measurement apparatus and a sideslip prevention control means. The sideslip prevention control means (typically comprising a hardware including a processor and a software (program) stored in a ROM, etc.) generates a brake signal and sends out it to the brake system in response to the measurement result of the sideslip angle.

A rollover risk measurement apparatus according to this embodiment can be mounted on drive recorders.

This computation is performed referring to each parameter written in the table 54.

The invention claimed is:

1. A vehicle motion measurement apparatus comprising
a driving state variable estimator for detecting plural measured signals other than a steering angle which change depending on the equipped condition of a vehicle;
a vehicle parameter obtainer for obtaining by a processor at least one vehicle parameter that does not change by the driving condition of the vehicle;
a sideslip angle temporary estimator for computing by the processor a sideslip angle temporary estimated value from a first set of parameters selected from the plural measured signals and at least one vehicle parameters including the mass;
a sideslip angle differential corresponding value computer for computing by the processor a sideslip angle differential corresponding value from a second set of signals selected from the plural measured signals and at least one vehicle parameter including no mass; and
a sideslip angle combined estimator for performing a precise estimation of a sideslip angle from the sideslip angle temporary estimate value and the sideslip angle differential corresponding value.

2. A vehicle motion measurement apparatus according to claim 1, wherein the sideslip angle temporally estimator computes by the processor the sideslip angle temporary estimate value by a sideslip angle temporary estimation function:

$$\beta_E = K_1 \times (\gamma/V) + K_2 \times a_y$$

where,
$K_1, K_2$: coefficients including measured signals
$\gamma$: yaw-rate
$V$: vehicle velocity
$a_y$: vehicle lateral acceleration.

3. A vehicle motion measurement apparatus according to claim 2, wherein $K_1 = L_r$, $$K_2 = mL_f/(2L \times C_r),$$

where
L: distance between the from axle and the rear axle
$L_f$: approximate distance between the vehicle gravity center and the front wheel axle
$L_r$: approximate distance between the vehicle gravity center and the rear wheel axle
m: vehicle mass
$C_r$: cornering stiffness.

4. A vehicle motion measurement apparatus according to claim 1, wherein the sideslip angle differential corresponding value computer computes by the processor the sideslip angle differential corresponding value by a sideslip angle differential corresponding value function:

$$\beta^D = (a_y/V) - \gamma.$$

5. A vehicle abnormal motion prevention apparatus comprising a vehicle motion measurement apparatus according to claim 1 and a sideslip prevention control means, wherein the sideslip prevention control means generates a brake signal in response to the measurement result of the sideslip angle and sends out the brake signal to a brake system.

* * * * *